(12) United States Patent
Callison (10) Patent No.: US 7,511,656 B2
(45) Date of Patent: Mar. 31, 2009

(54) SPOTLIGHT SYNTHETIC APERTURE RADAR (SAR) SYSTEM AND METHOD FOR GENERATING A SAR MAP IN REAL-TIME USING A MODIFIED POLAR FORMAT ALGORITHM (PFA) APPROACH

(75) Inventor: Rodney J. Callison, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 238 days.

(21) Appl. No.: 11/351,999

(22) Filed: Feb. 10, 2006

(65) Prior Publication Data

US 2007/0188371 A1    Aug. 16, 2007

(51) Int. Cl.
*G01S 3/08*    (2006.01)
(52) U.S. Cl. .................. 342/118; 342/25 A; 342/25 F; 342/196
(58) Field of Classification Search .................. 342/118
See application file for complete search history.

(56) References Cited

U.S. PATENT DOCUMENTS

| | | | | |
|---|---|---|---|---|
| 5,341,141 | A * | 8/1994 | Frazier et al. | 342/59 |
| 6,041,339 | A * | 3/2000 | Yu et al. | 708/313 |
| 6,603,424 | B1 * | 8/2003 | Abatzoglou | 342/25 R |
| 2004/0088343 | A1 * | 5/2004 | Cannon | 708/306 |
| 2006/0087471 | A1 * | 4/2006 | Hintz | 342/22 |
| 2007/0188371 | A1 | 8/2007 | Callison | |

OTHER PUBLICATIONS

Mastin, G. A., et al., "A Massively Parallel Digital Processor For Spotlight Synthetic Aperture Radar", International Journal of Supercomputer Applications; vol. 7(2), (1993), 97-112.*

Le, C., et al., "Onboard FPGAoBased SAR Processing for Future Spaceborne Systems", Proceedin.qs of the IEEE Radar Conference, 2004, Philadelphia, PA, (2004), 15-20.*

"International Application No. PCT/US2007/066623, International Search Report mailed May 27, 2008", 5 pgs.

"International Application No. PCT/US2007/066623, Written Opinion mailed May 27, 2008", 6 pgs.

Fang, W.-C., et al., "On-Board Fault-Tolerant SAR Processor for Spaceborne Imaging Radar Systems", *IEEE International Symposium on Circuits and Systems (ISCAS 2005)*,(2005), 420-423.

(Continued)

*Primary Examiner*—Thomas H Tarcza
*Assistant Examiner*—Timothy A Brainard
(74) *Attorney, Agent, or Firm*—Schwegman, Lundberg & Woessner, P.A.; Gregory J. Gorrie (57) ABSTRACT

Embodiments of spotlight synthetic aperture radar (SAR) systems and methods generating a SAR map in real time with minimum latency using a modified Polar Format Algorithm are generally described herein. Other embodiments may be described and claimed. In some embodiments, FPGA implemented down-range and cross-range resampling filters generate fully interpolated data which may be FFT processed as it is generated. In some embodiments, the down-range resample filter and the cross-range resample filter are output-based resampling filters that align a sinc function with an output grid and input coordinates define filter coefficients to modulate the input samples. In some embodiments, the down-range and cross-range resample filtering, coordinate generation, timing, address, and control, fully-interpolated data storage and the down-range FFT may be implemented in a single FPGA.

30 Claims, 7 Drawing Sheets

OTHER PUBLICATIONS

Le, C., et al., "Onboard FPGA-Based SAR Processing for Future Spaceborne Systems", *Proceedings of the IEEE Radar Conference, 2004*, Philadelphia, PA, (2004), 15-20.

Liu, H., et al., "Design of a Two-Channel Ultra High Frequence Data Acquisition System Based on FPGA", *International Conference on Radar, 2006. (CIE '06)* (2006), 3 pgs.

Mastin, G. A., et al., "A Massively Parallel Digital Processor For Spotlight Synthetic Aperture Radar", *International Journal of Supercomputer Applications*; vol. 7(2), (1993), 97-112.

Simon-Klar, C., et al., "A Multi DSP Board for Real Time SAR Processing using the HiPAR-DSP 16", *IEEE International Geoscience and Remote Sensing Symposium, IGARSS'02*), vol. 5, (2002), 2750-2752.

Vaillancourt, S., "Space Based Radar On-Board Processing Architecture", *Aerospace, 2005 IEEE Aerospace Conference*, (2005), 1-6.

* cited by examiner

DOWN-RANGE RESAMPLE FILTER

CROSS-RANGE RESAMPLE FILTER

SPOTLIGHT SYNTHETIC APERTURE RADAR (SAR) SYSTEM AND METHOD FOR GENERATING A SAR MAP IN REAL-TIME USING A MODIFIED POLAR FORMAT ALGORITHM (PFA) APPROACH

TECHNICAL FIELD

Some embodiments of the present invention pertain to radar systems. Some embodiments of the present invention relate to synthetic aperture radar (SAR), and some embodiments pertain to spotlight SAR. Some embodiments of the present invention relate to resampling filters.

BACKGROUND

Synthetic aperture radar (SAR) systems generate an effectively long antenna by platform motion and signal processing rather than the actual use of a long physical antenna. SAR systems may be used for airborne ground mapping. In spotlight mode, the antenna is effectively pointed or directed toward a region being imaged. Spotlight SAR systems are used in automatic target recognition (ATR) systems to identify and possibly engage targets that may not be emitting radio-frequency (RF) energy.

It is desirable for ATR systems to generate a SAR map of the region of interest in real-time; however this requires significant processing resources that either take up too much space and/or consume too much power for certain missile applications or are cost-prohibitive. For example, microprocessors that meet volume requirements and power constraints are generally too slow for real-time applications, while ASIC-implemented parallel hardware processing architectures can be expensive.

Thus, there are general needs for SAR systems and methods that can process SAR data in real-time. There are also general needs for SAR systems and methods that can process SAR data in real-time allowing for a quick look at a region of interest to ensure that the data is good. There are also general needs for SAR systems and methods that can process SAR data in real-time that take up less space and/or consume less power.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of others. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
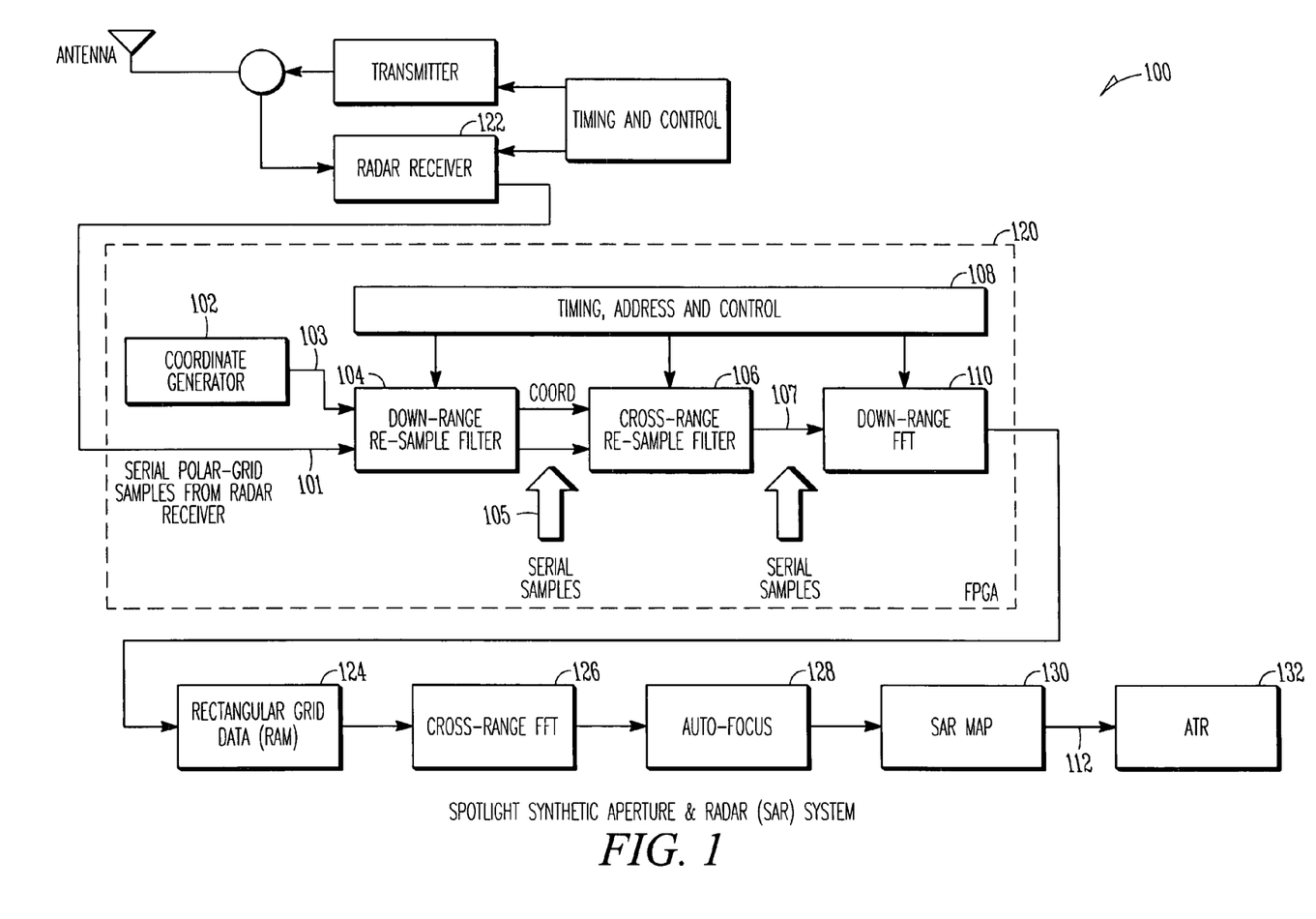
FIG. 1 is a functional block diagram of a spotlight synthetic aperture radar (SAR) system in accordance with some embodiments of the present invention.

FIG. 1 is a functional block diagram of a spotlight synthetic aperture radar (SAR) system in accordance with some embodiments of the present invention. Spotlight SAR system 100 includes down-range resample filter 104 to interpolate input samples 101 provided in polar-grid coordinates to generate down-range interpolated samples 105. Spotlight SAR system 100 also includes cross-range resample filter 106 to further interpolate down-range interpolated samples 105 to generate fully-interpolated samples 107. Fully-interpolated samples 107 may represent phase-history data.

In some embodiments, spotlight SAR system 100 also includes radar receiver 122 which may provide input samples 101 in a serial manner. In these embodiments, input samples 101 may be radar return samples provided by a correlator, although the scope of the invention is not limited in this respect.

Fully-interpolated samples 107 may refer to samples that have been interpolated by both down-range resample filter 104 and cross-range resample filter 106. Cross-range resample filter may include an internal memory to receive and store fully-interpolated samples 107. In some embodiments, the cross range resample filter internal memory may store fully-interpolated samples 107 as a matrix or in matrix form. Fully-interpolated samples 107 stored in the internal memory of cross-range resample filter 106 may represent phase-history data.

SAR system 100 may also include Fourier transform circuitry to perform two-dimensional (2D) Fourier transforms on the phase-history data to generate SAR map 112. In some embodiments, SAR system 100 may include down-range Fourier transform circuitry 110 that may perform a first dimension of a two-dimensional discrete Fourier transform, such as a fast Fourier transform (FFT), on the phase-history data. In these embodiments, down-range Fourier transform circuitry 110 may perform a down-range Fourier transform on each column of data in the internal memory of cross-range resample filter 106.

SAR system 100 may also include memory 124, which may be a random access memory (RAM) configured to store the output data from down-range Fourier transform circuitry 110 in a rectangular grid. SAR system 100 may also include cross-range Fourier transform circuitry 126 that may perform the second dimension of the two-dimensional discrete Fourier transform, such as a fast Fourier transform (FFT), on data in memory 124. In some embodiments, cross-range Fourier transform circuitry 126 may perform a cross-range Fourier transform on rows of data in memory 124. In some embodiments, SAR system 100 may also include auto-focus circuitry 128 and SAR map generator 130 to generate SAR map 112. SAR system 100 may also include automatic target recognition (ATR) system 132 for identifying targets using SAR map 112, although the scope of the invention is not limited in this respect.

In some embodiments, SAR map 112 may be used for automatic target recognition on board an avionics platform, such as a missile, to locate and identify a target. In some embodiments, SAR map 112 may also be used to direct the platform toward an identified target, although the scope of the invention is not limited in this respect.

SAR system 100 may also include coordinate generator 102 to generate coordinates 103 for use by down-range resample filter 104 and cross-range resample filter 106. SAR system 100 may also include timing, address and control circuitry 108 to coordinate the operations within down-range resample filter 104 and cross-range resample filter 106 including the selection of filter coefficients. This is described in more detail below.

In accordance with some embodiments, coordinate generator 102, down-range resample filter 104, cross-range resample filter 106, timing, address and control circuitry 108 and down-range Fourier transform circuitry 110 may be implemented within a single field-programmable gate array (FPGA), such as FPGA 120, although the scope of the invention is not limited in this respect. In these embodiments, memory 124 may be external to FPGA 120, and cross-range Fourier transform circuitry 126, auto-focus circuitry 128 and SAR map generator 130 may be implemented by one more processors external to FPGA 120, although the scope of the invention is not limited in this respect. In some alternate embodiments, additional circuitry may be implemented within one or more FPGAs, including memory 124 and cross-range Fourier transform circuitry 126, although the scope of the invention is not limited in this respect.

Figure 2A:
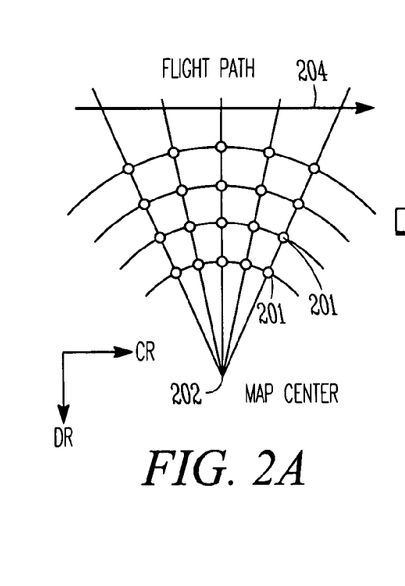
FIGS. 2A, 2B, 2C and 2D illustrate the interpolation of down-range and cross-range data in accordance with some embodiments of the present invention.
Figure 2B:
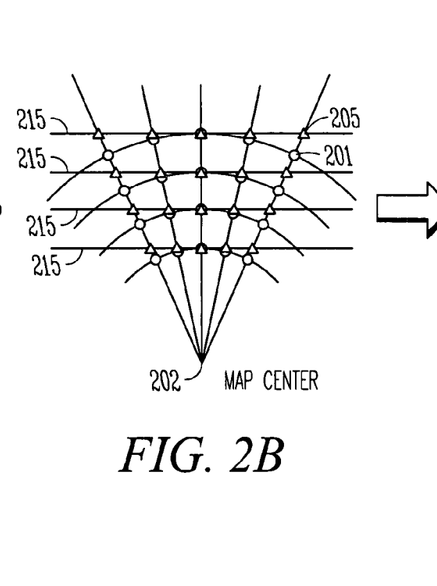
Figure 2C:
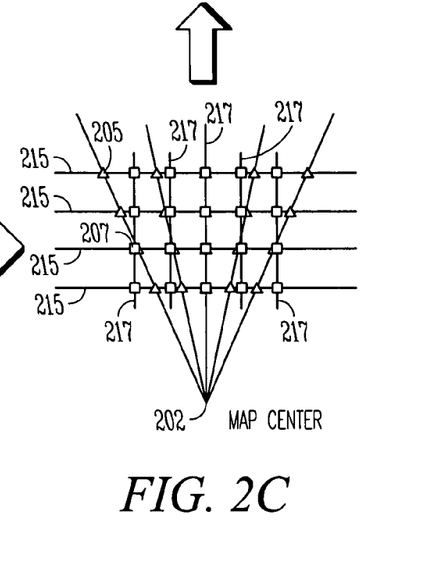
Figure 2D:
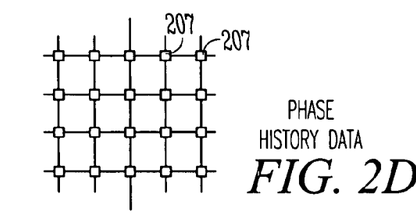

FIGS. 2A, 2B, 2C and 2D illustrate the interpolation of down-range and cross-range data in accordance with some embodiments of the present invention. FIG. 2A illustrates the collection of input data in polar format, FIG. 2B illustrates the operation of down-range resample filter 104 (FIG. 1), FIG. 2C illustrates the operation of cross-range resample filter 106 (FIG. 1), and FIG. 2D illustrates fully-interpolated samples 107 (FIG. 1) that may be stored in matrix form in cross-range resample filter internal memory.

As illustrated in FIG. 2A, input samples 201 (illustrated as circles) may correspond to input samples 101 (FIG. 1) and may comprise radar-return samples provided by radar receiver 122 (FIG. 1). In some spotlight SAR embodiments, input samples 201 may comprise polar-coordinate samples that are sampled along flight path 204 and generated with respect to map center 202 by directing radar signals to map center 202. In these embodiments, SAR map 112 (FIG. 1) may comprise a ground image of an area of interest around map center 202.

As illustrated in FIG. 2B, down-range interpolated samples 205 (illustrated as triangles) may correspond to down-range interpolated samples 105 (FIG. 1) and are generated to be on horizontal grid lines 215 parallel to the flight path 204 by down-range resample filter 104 (FIG. 1). Input samples 201 may be effectively resampled in down range at different rates to arrive at down-range interpolated samples 205 along the same radial lines.

As illustrated in FIG. 2C, fully-interpolated samples 207 (illustrated as squares) may correspond to fully down-range interpolated samples 107 (FIG. 1) and are generated to be on vertical grid lines 217 perpendicular to flight path 204. Cross-range resample filter 106 (FIG. 1) may effectively resample down-range interpolated samples 205 in cross range to generate fully-interpolated samples 207 on vertical grid lines 217. As illustrated in FIG. 2C, fully-interpolated samples 207 may also be on the horizontal grid lines 215.

The resulting phase-history data illustrated in FIG. 2D may comprise evenly-spaced samples suitable for performing FFT operations by down-range Fourier transform circuitry 110 (FIG. 1), although the scope of the invention is not limited in this respect.

In some embodiments, flight path 204 may be a trajectory with a non-zero crossing velocity relative to a line-of-sight to map center 202, although the scope of the invention is not limited in this respect. During movement along flight path 204, SAR system 100 (FIG. 1) transmits and receives an RF radar waveform. In some embodiments, the flight path 204 may curve around map center 202 however grid lines 215 may still be considered parallel to flight path 204 and grid lines 217 may still be considered perpendicular to flight path 204, although the scope of the invention is not limited in this respect. In some embodiments, flight path 204 may be a straight line and the phase-history data may be motion compensated so as to appear as if the flight path is curved.

Figure 3:
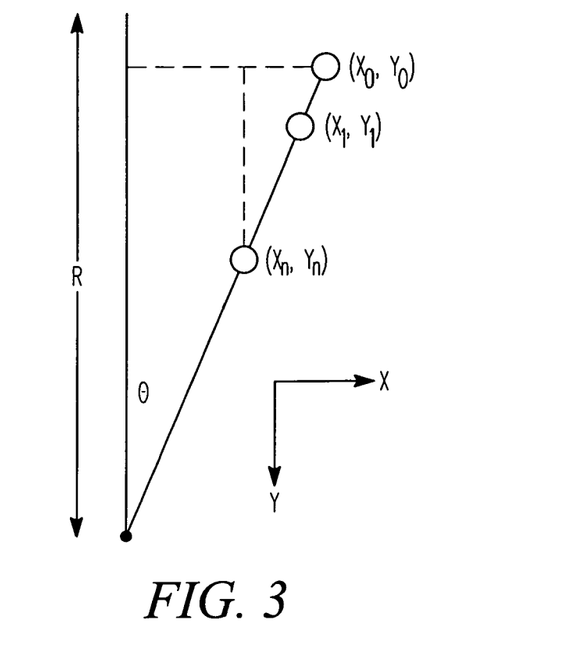
FIG. 3 illustrates polar-to-rectangular coordinate creation in accordance with some embodiments of the present invention.

FIG. 3 illustrates polar-to-rectangular coordinate creation in accordance with some embodiments of the present invention. In some embodiments, the geometry shown in FIG. 2A may depend upon a range to map center and an angle from the center line to a radial defined by a particular radar pulse. In these embodiments, fully-interpolated samples 107 (FIG. 1) may be represented as points on a rectangular grid in which the Y-origin may be at the platform and the spacing may be the chip spacing along a center line. In these embodiments, the X-origin may be at the center line and the spacing may be a radial spacing, although the scope of the invention is not limited in this respect. In these embodiments, the input data may be expressed in terms of the output grid, which is illustrated in FIG. 3. In these embodiments, the radius (R) from the map center may be defined once per map, and theta (θ) may be defined for each radial or pulse. The X coordinates for each sample may be determined from the following equations:

$X_0 = R\sin(\theta);$ $X_1 = X_0 - \sin(\theta);$ and $X_n = X_0 - n\sin(\theta).$ The y coordinates for each sample may be determined from the following equations:

$Y_0 = R(1 - \cos(\theta));$ $Y_1 = Y_0 + \cos(\theta);$ and $Y_n = Y_0 + n\cos(\theta).$ In some embodiments, coordinate generator 102 (FIG. 1) may provide coordinates 103 (FIG. 1) to down-range resample filter 104 (FIG. 1) and to cross-range resample filter 106 (FIG. 1) based on these equations, although the scope of the invention is not limited in this respect.

Figure 4A:
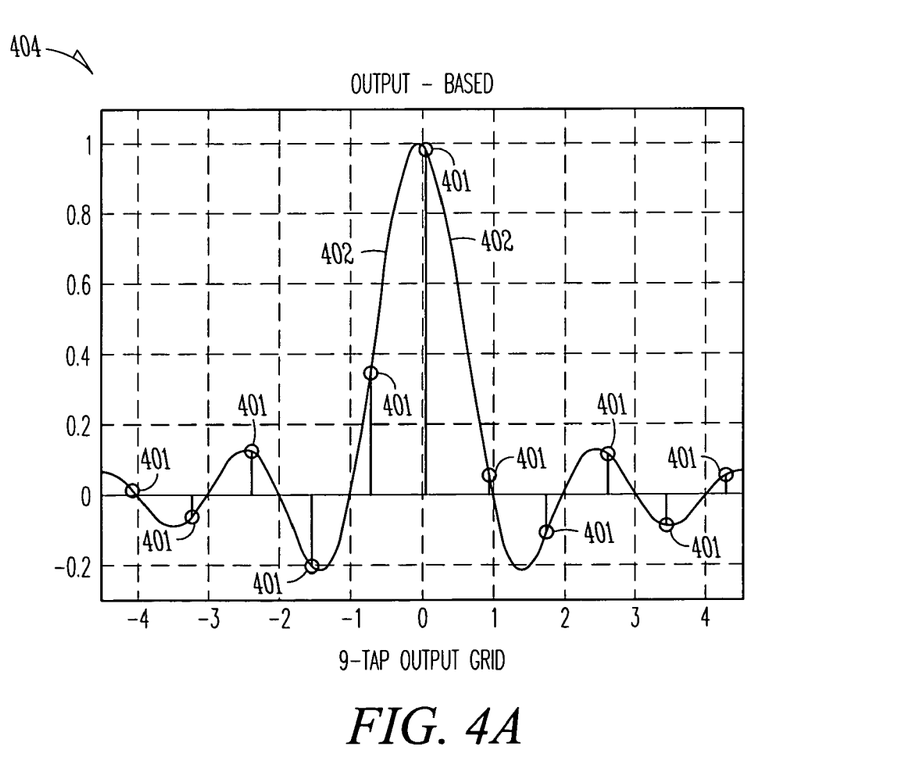
FIG. 4A and FIG. 4B illustrate the generation of output-based coefficients by the resampling filters in accordance with some embodiments of the present invention.
Figure 4B:
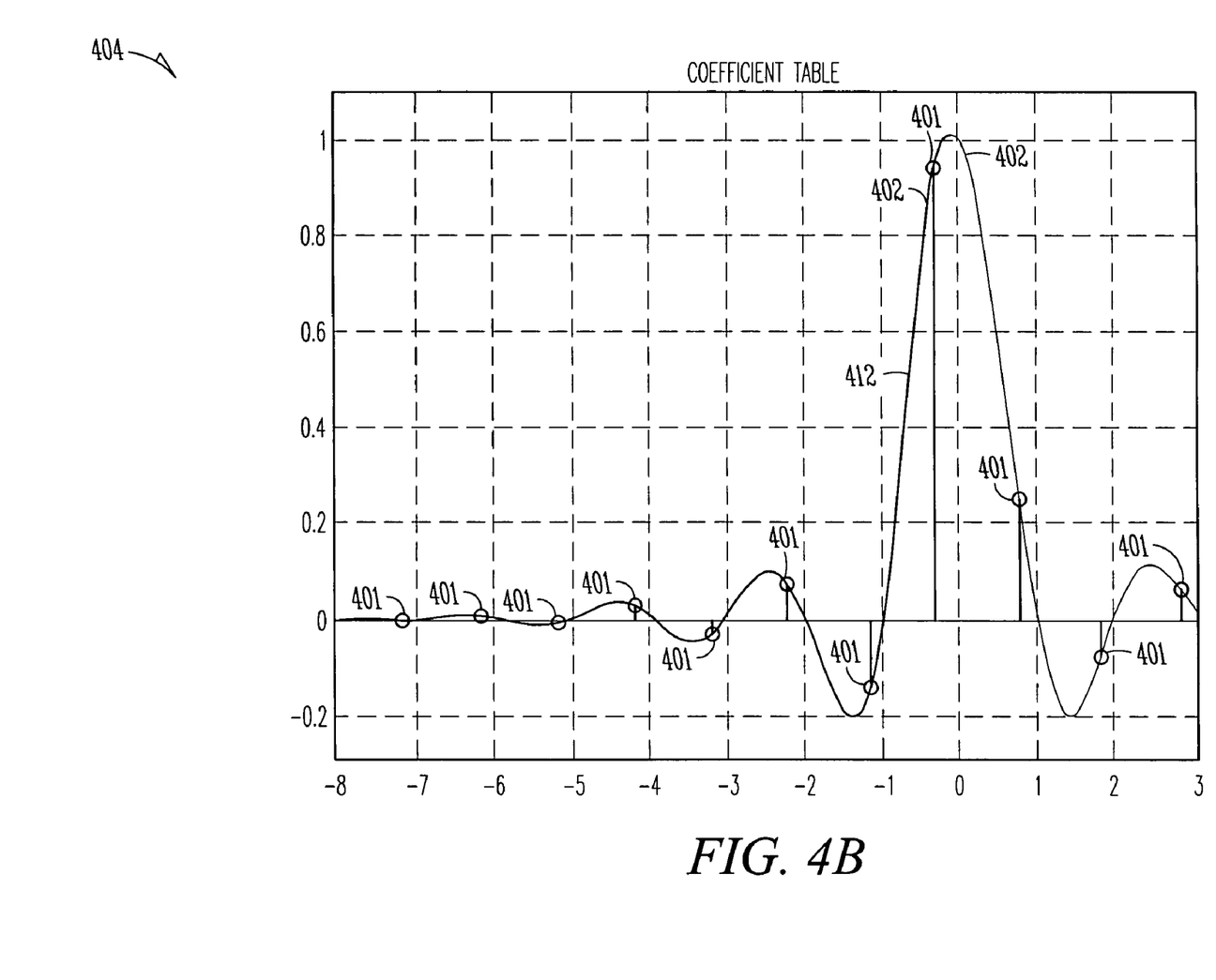

FIG. 4A and FIG. 4B illustrate the generation of output-based coefficients by the resampling filters in accordance with some embodiments of the present invention. In these embodiments, down-range resample filter 104 (FIG. 1) and cross-range resample filter 106 (FIG. 1) may be output-based resampling filters that align a sinc function (i.e., a sinx/x function) with an output grid. In some embodiments, down-range resample filter 104 (FIG. 1) and cross-range resample filter 106 (FIG. 1) may align sinc function 402 with output grid 404 and filter coefficients may modulate the inputs (e.g., input samples 101 (FIG. 1) and/or down-range interpolated samples 105 (FIG. 1). In these embodiments, each input sample 401 may contribute to a plurality of outputs. In other words, in these output-based resampling embodiments, resample filters 104 and 106 (FIG. 1) may use a plurality of input samples 401 to generate coefficients from sinc function 402. The coefficients that multiply inputs of resample filters 104 and 106 (FIG. 1) may be taken from the points of sinc function 402 defined by coordinates of the corresponding input samples. In this way, each of input samples 401 may contribute to more than one output, although the scope of the invention is not limited in this respect. The x-axis in FIGS. 4A and 4B correspond to the tap number of the filter.

In the example illustrated in FIG. 4A, eleven input samples 401 are used to index into sinc function 402, each of which contributes to the output at output grid 404. Some conventional resampling filters, on the other hand, are input-based resampling filters in which a sinc function is aligned with an input grid using the input samples. These conventional resampling filters use the output to define the filter coefficients.

FIG. 4A may be used to describe the operation of either down-range resample filter 104 (FIG. 1) or cross-range resample filter 106 (FIG. 1). When FIG. 4A is used to describe down-range resample filter 104, input samples 401 may correspond to input samples 101 (FIG. 1), and one of down-range interpolated samples 105 (FIG. 1) may correspond to an accumulation of input samples 101 (FIG. 1) modulated by weights derived from sinc function 402. When FIG. 4A is used to describe cross-range resample filter 106 (FIG. 1), input samples 401 may correspond to down-range interpolated samples 105 (FIG. 1), and fully-interpolated samples 107 (FIG. 1) may correspond to an accumulation of down-range interpolated samples 105 (FIG. 1) modulated by the weights derived from sinc function 402.

In some embodiments, down-range resample filter 104 (FIG. 1) and/or cross-range resample filter 106 (FIG. 1) utilize the symmetric property of sinc function 402, as illustrated in FIG. 4B. This is described in more detail below.

In some embodiments, down-range resample filter 104 (FIG. 1) and cross-range resample filter 106 (FIG. 1) may comprise transpose canonical-form finite-impulse-response (FIR) filter architectures wherein the filter weights may change for each input sample. In some example embodiments, each input sample may contribute to a plurality of outputs (e.g., sixteen), although the scope of the invention is not limited in this respect.

Figure 5A:
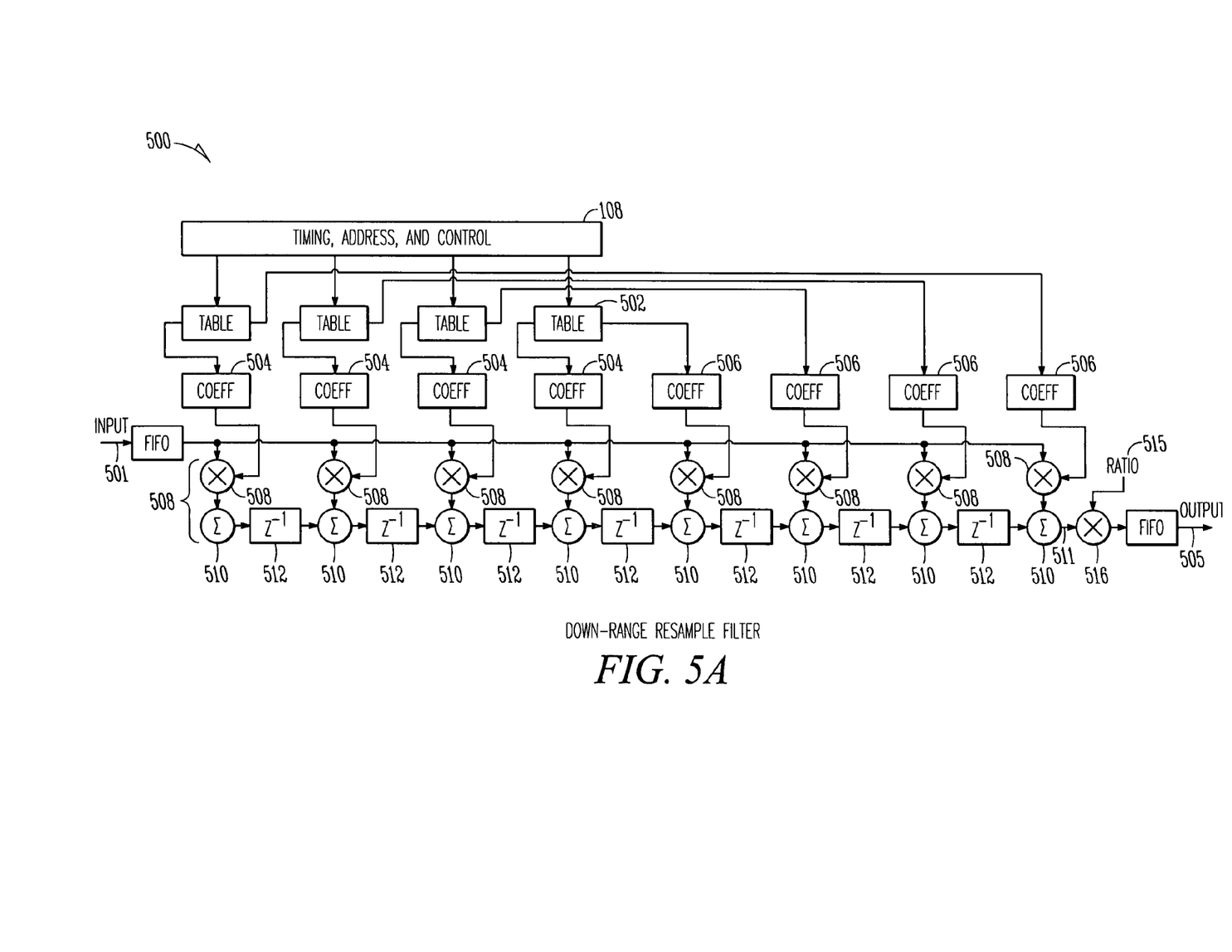
FIG. 5A illustrates a down-range resample filter in accordance with some embodiments of the present invention.

FIG. 5A illustrates a down-range resample filter in accordance with some embodiments of the present invention. Down-range resample filter 500 may be suitable for use as down-range resample filter 104 (FIG. 1), although other filter configurations may also be used.

In some embodiments, down-range resample filter 500 may comprise a plurality of tables 502 to store data representing half of a sinc function. Each table 502 of the plurality may store data representing a side lobe of the sinc function. In these embodiments, timing, address and control circuitry 108 (FIG. 1) selects coefficients 504 (i.e., weights) for a first half of the sinc function on a sample-by-sample basis from the tables 502 and performs a bit-reversal of the index into tables 502 to select coefficients 506 from tables 502 for a second half of the sinc function. In this way, the symmetry of the sinc function, such as sinc function 402 (FIG. 4B), can be taken advantage of so that tables 502 need to be provided only for one side 412 (FIG. 4B) of sinc function 402 (FIG. 4B). Accordingly, less memory space of FPGA 120 (FIG. 1) may be required. In some embodiments, coefficients 504 and 506 may be changed and/or reselected for each input sample, although the scope of the invention is not limited in this respect.

In some embodiments, down-range resample filter 500 also include weighting circuitry 508, accumulators 510 and delay elements 512 within FPGA 120 (FIG. 1) to apply selected coefficients 504, 506 to input samples 501 and to combine and delay the weighted samples to generate output samples 505, although the scope of the invention is not limited in this respect. In some example embodiments, through the operation of down-range resample filter 500, each input sample 501 may contribute to a plurality of output samples 505, although the scope of the invention is not limited in this respect. In the example illustrated in FIG. 5A, each input sample 501 may contribute to sixteen or fewer output samples 505. In some example embodiments, through the operation of down-range resample filter 500, each of output samples 505 may receive contributions of a plurality of input samples 501, although the scope of the invention is not limited in this respect. In the example illustrated in FIG. 5A, each of output samples 505 may receive contributions from sixteen or more input samples 501.

In some embodiments, timing, address and control circuitry 108 (FIG. 1) may calculate down-sample ratio 515 based on a difference between an input-sample coordinate and a previous input-sample coordinate. In these embodiments, down-range resample filter 500 may include circuitry 516 to scale output samples 511 to generate output samples 505 which may correspond to down-range interpolated samples 105 (FIG. 1). In some embodiments, when down-sample ratio 515 is greater than 1:1, timing, address and control circuitry 108 (FIG. 1) does not clock filter 500 with each input sample. Although timing, address and control circuitry 108 (FIG. 1) is illustrated in FIG. 5, it corresponds to timing, address and control circuitry 108 (FIG. 1) and is not necessarily part of down-range resample filter 500.

Figure 5B:
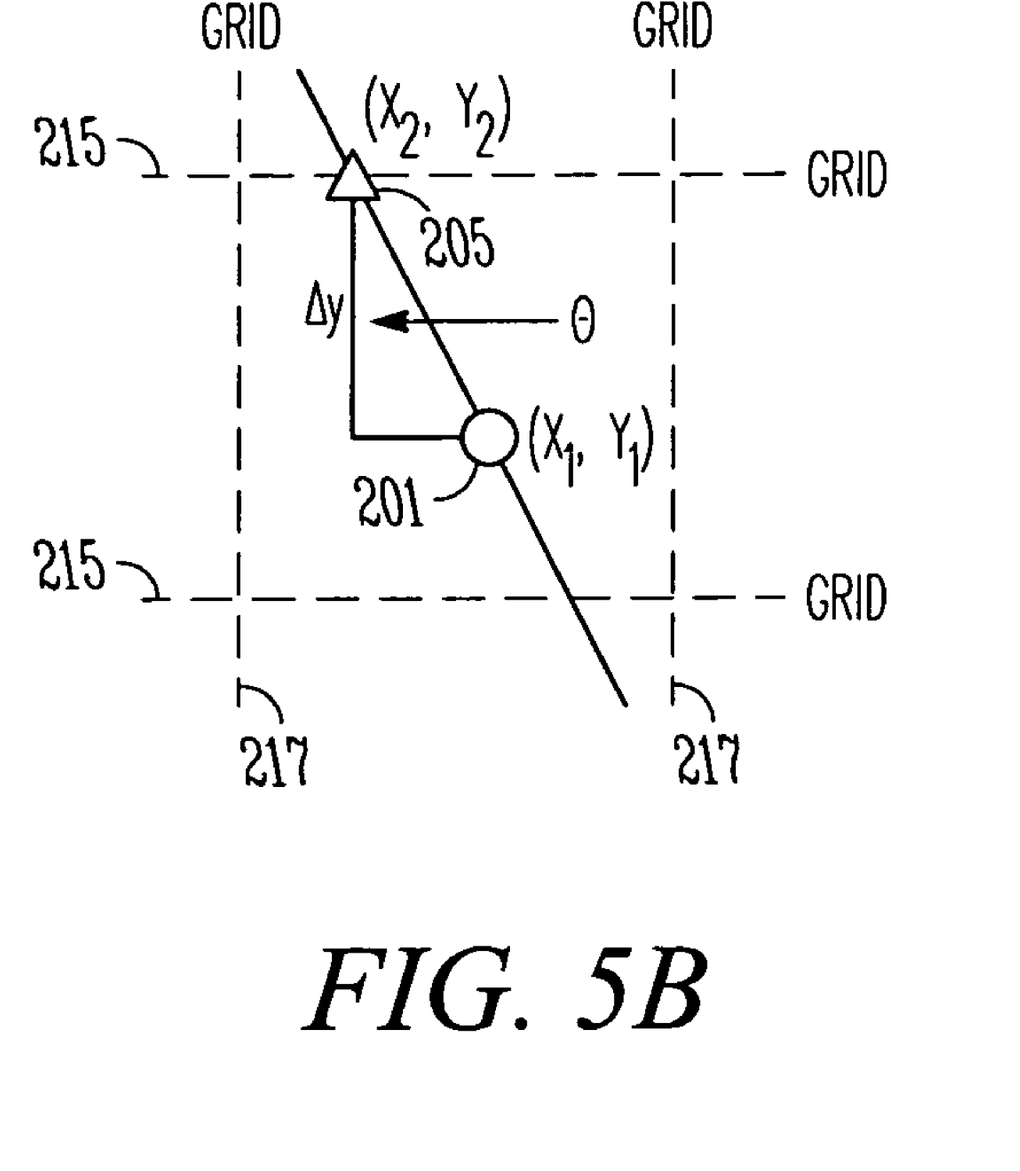
FIG. 5B illustrates the computation of the X-coordinate of the output data from a down-range resample filter in accordance with some embodiments of the present invention.

As illustrated in FIG. 5B, in some embodiments, timing, address and control circuitry 108 (FIG. 5A) may modify the X-coordinate of each of output samples 505 (FIG. 5A) of down-range resample filter 500 (FIG. 5A). To reduce processing, the X-coordinate may be based on the prior X-coordinate. In these embodiments, the X-coordinate may be may be computed based on the following equation:

$$X_2 = X_1 + \Delta y \tan \theta.$$

The tangent of theta may be determined from a look-up table, and $\Delta y$ is a fractional part of the input coordinate, as illustrated in FIG. 5B. An example of theta used in the above equation is illustrated in FIG. 3.

Figure 6:
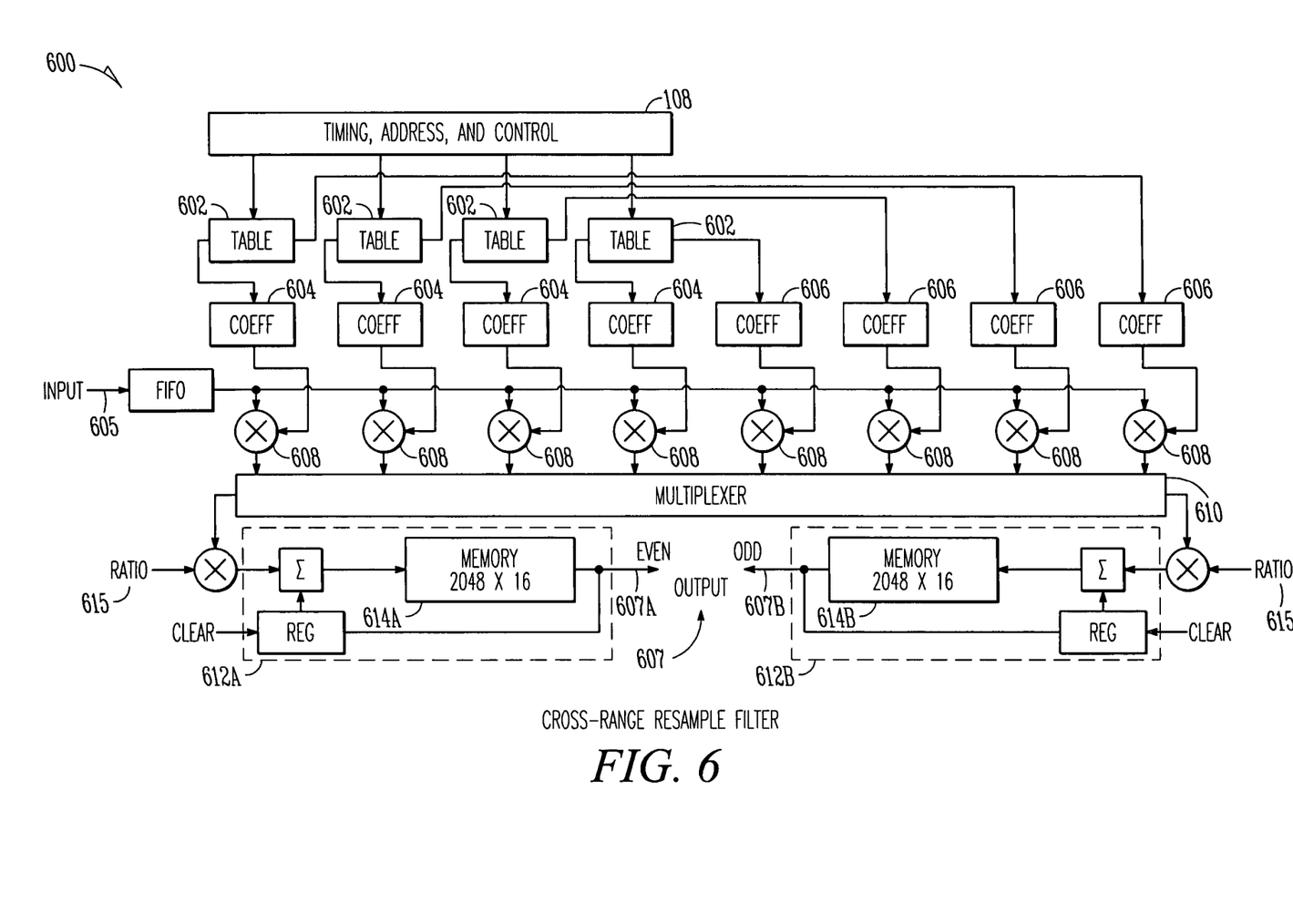
FIG. 6 illustrates a cross-range resample filter in accordance with some embodiments of the present invention.

FIG. 6 illustrates a cross-range resample filter in accordance with some embodiments of the present invention. Cross-range resample filter 600 may be suitable for use as cross-range resample filter 106 (FIG. 1), although other filter configurations may also be used. Cross-range resample filter 600 may include a plurality of tables 602 to store data representing half of a sinc function. Each table 602 may store data representing a side lobe of the sinc function. In some embodiments, data stored in tables 602 may be identical to data stored in tables 502 (FIG. 5), although the scope of the invention is not limited in this respect. Timing, address and control circuitry 108 (FIG. 1) may select coefficients 604 (i.e., weights) for the first half of the sinc function on a sample-by-sample basis from the tables 602 and may perform a bit-reversal of the index into tables 602 to select at least some of coefficients 606 from the tables 602 for a second half of the sinc function taking advantage of the symmetry of the sinc function so that tables 602 may need to be provided only for one side of the sinc function. Accordingly, less memory space of FPGA 120 (FIG. 1) may be required.

In some embodiments, cross-range resample filter 600 may also include weighting circuitry 608 to apply selected coefficients 604 and 606 to down-range interpolated samples 605 provided by down-range resample filter 600. Down-range interpolated samples 605 may correspond to down-range interpolated samples 105 (FIG. 1) and 505 (FIG. 5).

In some embodiments, cross-range resample filter 600 may also include multiplexer 610 to multiplex the weighted samples provided by weighting circuitry 608, and one or more accumulators 612A and 612B to store and combine the outputs from multiplexer 610. Cross-range resample filter 600 may also include memory 614A and 612B to generate output data 607. Output data 607 may comprise fully-interpolated samples and may correspond to fully-interpolated samples 107 (FIG. 1). In some embodiments, coefficients 604 and 606 may be changed and/or reselected for each input sample. Memory 614A and 612B may correspond to the cross range resample filter internal memory discussed above in reference to cross-range resample filter 106 (FIG. 1).

In some embodiments, accumulators 612A and 612B may provide outputs (i.e., even and odd) so that the accumulators 612A and 612B respectively generate even and odd portions 607A and 607B of fully-interpolated samples 107 (FIG. 1). The use of two accumulators may help prevent a memory access time of the first and second accumulators from limiting a rate of processing down-range interpolated samples 605 provided by the down-range resample filter 104 (FIG. 1). The even and odd outputs (i.e., even and odd portions 607A and 607B) are for illustration of some embodiments. Other embodiments of the present invention may have a single accumulator, similar to accumulator 612A, with a single output, such as output data 607. In alternative embodiments, more than two accumulators may be used.

In some embodiments, cross-range resample filter 600 may allow for either up-sampling or down-sampling, although the scope of the invention is not limited in this respect. In some embodiments, the outputs of multiplexer 610 may be multiplied by ratio 615, which may be determined by the x-coordinates of the input data (e.g., down-range interpolated samples 605).

Unlike some conventional spotlight SAR systems, in accordance with some embodiments, there is no need for a memory at the output of down-range resample filter 104 (FIG. 1) since data feeds directly into the cross-range resample filter 106 (FIG. 1) as it is down-range resampled. Unlike some conventional spotlight SAR systems, in accordance with some embodiments, cross-range resample filter 106 (FIG. 1) may include an internal memory (i.e., memories 614A and 614B (FIG. 6)) to store data that has been partially cross-range resampled. This memory may be significantly smaller (e.g., 2,000 by 16 instead of 2,000 by 2,000) than memories used by some conventional spotlight SAR systems. In accordance with some embodiments, when an entire column of the memory has been completely cross-range resampled, a down-range FFT may be performed. The output of down-range Fourier transform circuitry 110 (FIG. 1) may be provided to memory 124 (FIG. 1).

Although timing, address and control circuitry 108 (FIG. 1) is illustrated in FIG. 6, it corresponds to timing, address and control circuitry 108 (FIG. 1) and is not necessarily part of down-range resample filter 600.

As used herein, real time refers to processing data to generate output data at least the same rate as the input data is received or collected. Some embodiments of the present invention generate SAR output data in real-time with minimum latency.

Although SAR system 100 (FIG. 1), down-range resample filter 500 (FIG. 5) and cross-range resample filter 600 (FIG. 6) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of SAR system 100 (FIG. 1), down-range resample filter 500 (FIG. 5) and/or cross-range resample filter 600 (FIG. 6) may refer to one or more processes operating on one or more processing elements, although the scope of the invention is not limited in this respect.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Some embodiments of the present invention may be implemented in one or a combination of hardware, firmware and software. Some embodiments of the present invention may be implemented by one or more FPGAs. Some embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A spotlight synthetic aperture radar (SAR) system comprising:

a receiver to generate input samples with respect to a map center from radar returns by sampling along a flight path;

a down-range resample filter to interpolate the input samples in polar-grid coordinates to generate down-range interpolated samples on grid lines parallel to the flight path; and a cross-range resample filter to further interpolate the down-range interpolated samples to generate fully-interpolated samples on grid lines perpendicular to the flight path, wherein the down-range resample filter and the cross-range resample filter are implemented within a single field-programmable gate array (FPGA), wherein the down-range resample filter comprises:

a plurality of tables to store data representing a sinc function;

circuitry to select coefficients for half of the sinc function on a sample-by-sample basis from the tables for application to the input samples;

weighting circuitry to apply the selected coefficients to the down-range interpolated samples provided by the down-range resample filter;

a multiplexer to multiplex weighted samples provided by the weighting circuitry; and one or more accumulators to store and combine outputs from the multiplexer to generate output data comprising the fully-interpolated samples.

2. The radar system of claim 1 wherein the cross-range resample filter includes internal memory within the FPGA to store the fully-interpolated samples in a rectangular grid structure, the fully-interpolated samples representing phase-history data, and wherein the radar system further comprises:

down-range Fourier transform circuitry implemented within the FPGA to perform a Fourier transform on portions of the phase-history data.

3. The radar system of claim 2 further comprising:

external memory to store output data from the down-range Fourier transform circuitry in a rectangular grid structure; and cross-range Fourier transform circuitry to perform a Fourier transform on portions of data from external memory for use in generating a SAR map around the map center, wherein the down-range Fourier transform circuitry performs a first dimension of a two-dimensional Fourier transform, and wherein the cross-range Fourier transform circuitry performs a second dimension of the two-dimensional Fourier transform.

4. The radar system of claim 3 wherein the SAR map comprises a ground image of an area of interest around the map center, wherein the receiver is a radar receiver, wherein the input samples comprise radar-return samples provided by the radar receiver, and wherein the input samples comprise polar-coordinate samples sampled along the flight path and generated with respect to the map center by directing radar signals to the map center.

5. The radar system of claim 1 wherein the down-range resample filter and the cross-range resample filter are output-based resampling filters that align the sinc function with an output grid and input coordinates define filter coefficients to modulate the input samples.

6. The radar system of claim 5 wherein the down-range resample filter and the cross-range resample filter comprise transpose canonical-form finite-impulse-response (FIR) filters that allow weights to change for each input sample.

7. A spotlight synthetic aperture radar (SAR) system comprising:

a down-range resample filter to interpolate input samples in polar-grid coordinates to generate down-range interpolated samples; and a cross-range resample filter to further interpolate the down-range interpolated samples to generate fully-interpolated samples representing phase-history data, wherein the down-range resample filter includes timing, address and control circuitry and the down-range resample filter and the cross-range resample filter are implemented within a single field-programmable gate array (FPGA), wherein the down-range resample filter and the cross-range resample filter are output-based resampling filters that align a sinc function with an output grid and input coordinates define filter coefficients to modulate the input samples, wherein the down-range resample filter comprises a plurality of tables to store data representing half of the sinc function, wherein each table of the plurality stores data representing a side lobe of the sinc function, wherein the timing, address and control circuitry selects coefficients for a first half of the sinc function on a sample-by-sample basis from the tables and performs a bit-reversal of a table index to select at least some of coefficients from the tables for a second half of the sinc function, wherein the timing, address and control circuitry calculates a down-sample ratio based on a difference between an input-sample coordinate and a previous input sample coordinate, and wherein the down-range resample filter comprises circuitry to scale output samples based on the down-sample ratio to generate serial down-range interpolated samples.

8. The radar system of claim 7 wherein the down-range resample filter further comprises circuitry, within the FPGA, to apply the selected coefficients to the input samples and to combine and delay the weighted samples to generate output samples.

9. The radar system of claim 7 wherein the cross-range resample filter comprises a plurality of tables to store data representing half of a sinc function, wherein each table of the plurality stores data representing a side lobe of the sinc function, and wherein the timing, address and control circuitry selects coefficients for a first half of the sinc function on a sample-by-sample basis from the tables and performs a bit-reversal of a table index to select at least some of coefficients from the tables for a second half of the sinc function.

10. The radar system of claim 9 wherein the cross-range resample filter further comprises:

weighting circuitry, within the FPGA, to apply the selected coefficients to the down-range interpolated samples provided by the down-range resample filter;

a multiplexer to multiplex weighted samples provided by the weighting circuitry; and one or more accumulators to store and combine outputs from the multiplexer to generate output data comprising the fully-interpolated samples.

11. The radar system of claim 10 wherein the one or more accumulators comprise a first and second accumulator to receive outputs from the multiplexer, wherein each accumulator generates a portion of the fully-interpolated samples, and wherein, the use of both the first and second accumulators prevents a memory access time of the first and second accumulators from limiting a rate of processing the down-range interpolated samples provided by the down-range resample filter.

12. A method of generating a synthetic aperture radar (SAR) map comprising:
   interpolating input samples in polar-grid coordinates to generate down-range interpolated samples on grid lines parallel to a flight path;
   interpolating the down-range interpolated samples to generate fully-interpolated samples on grid lines perpendicular to the flight path, the fully-interpolates samples representing phase-history data; and
   selecting coefficients for half of a sinc function on a sample-by-sample basis from the tables as part of the interpolating,
   wherein data representing half of the sinc function is stored within a plurality of tables,
   wherein the interpolating the input samples and the interpolating the down-range interpolated samples are performed within a field-programmable gate array (FPGA), and
   wherein the input samples are sampled along the flight path and generated with respect to a map center by directing a radar signal toward the map center,
   wherein the method includes:
   applying the selected coefficients to the down-range interpolated samples provided by the down-range resample filter;
   multiplexing weighted samples from the applying the selected coefficients; and
   storing and combining outputs from the multiplexing generate output data comprising the fully-interpolated samples.

13. The method of claim 12 wherein the interpolating the input samples is performed by a down-range resample filter within the FPGA,
   wherein the interpolating the down-range interpolated samples is performed by a cross-range resample filter within the FPGA, and
   wherein the method further comprises:
   storing the fully-interpolated samples from the cross-range resample filter in a rectangular grid structure in a memory of the cross-range resample filter, the fully-interpolated samples representing the phase-history data; and
   performing a down-range Fourier transform with down-range Fourier transform circuitry within the FPGA on portions of the phase-history data.

14. The method of claim 13 further comprising:
   storing, in memory external to the FPGA, output data from the down-range Fourier transform circuitry in a rectangular grid structure; and
   performing a cross-range Fourier transform with cross-range Fourier transform circuitry on portions of data from external memory for use in generating a SAR map around the map center,
   wherein the down-range Fourier transform circuitry performs a first dimension of a two-dimensional Fourier transform, and
   wherein the cross-range Fourier transform circuitry performs a second dimension of the two-dimensional Fourier transform.

15. The method of claim 14 wherein the SAR map comprises a ground image of an area of interest around the map center,
   wherein the input samples comprise radar-return samples provided by a radar receiver,
   wherein the input samples comprise polar-coordinate samples sampled along the flight path and generated with respect to the map center by directing radar signals to the map center.

16. The method of claim 13 wherein the down-range resample filter and the cross-range resample filter are output-based resampling filters that align the sinc function with an output grid and input coordinates define filter coefficients to modulate the input samples.

17. The method of claim 16 wherein the down-range resample filter and the cross-range resample filter comprise transpose canonical-form finite-impulse-response (FIR) filters that allow weights to change for each input sample.

18. A method of generating a synthetic aperture radar (SAR) map comprising:
   interpolating input samples in polar-grid coordinates to generate down-range interpolated samples on grid lines parallel to a flight path; and
   interpolating the down-range interpolated samples to generate fully-interpolated samples on grid lines perpendicular to the flight path, the fully-interpolates samples representing phase-history data,
   wherein the interpolating the input samples and the fui4her interpolating the down-range interpolated samples are performed within a field-programmable gate array (FPGA), and
   wherein the input samples are sampled along the flight path and generated with respect to a map center by directing a radar signal toward the map center,
   wherein the interpolating the input samples is performed by a down-range resample filter within the FPGA,
   wherein the further interpolating the down-range interpolated samples is performed by a cross-range resample filter within the FPGA, and
   wherein the method further comprises:
   storing the fully-interpolated samples from the cross-range resample filter in a rectangular grid structure in a memory of the cross-range resample filter, the fully-interpolated samples representing the phase-history data; and
   performing a down-range Fourier transform with down-range Fourier transform circuitry within the FPGA on portions of the phase-history data,
   wherein the down-range resample filter and the cross-range resample filter are output-based resampling filters that align a sinc function with an output grid and input coordinates define filter coefficients to modulate the input samples,
   wherein the method further comprises:
   storing data representing half of the sinc function within a plurality of tables of the down-range resample filter, wherein each table of the plurality stores data representing a side lobe of the sinc function;
   selecting coefficients for a first half of the sinc function on a sample-by-sample basis from the tables;
   performing a bit-reversal of a table index to select at least some of coefficients from the tables for a second half of the sinc function;
   calculating a down-sample ratio based on a difference between an input-sample coordinate and a previous input sample coordinate; and
   scaling the output samples based on the down-sample ratio to generate serial down-range interpolated samples.

19. The method of claim 18 further comprising, within the down-range resample filter:

applying the selected coefficients to the input samples; and
combining and delaying the weighted samples to generate output samples.

20. The method of claim 18 further comprising:
storing data representing half of the sinc function in a plurality of tables of the cross-range resample filter, wherein each table of the plurality stores data representing a side lobe of the sinc function;
selecting coefficients for a first half of the sinc function on a sample-by-sample basis from the tables; and
performing a bit-reversal of a table index to select at least some of coefficients from the tables for a second half of the sinc function.

21. The method of claim 20 further comprising, within the cross-range resample filter:
applying the selected coefficients to the down-range interpolated samples provided by the down-range resample filter;
multiplexing weighted samples provided by the weighting circuitry; and
storing and combining outputs from the multiplexer to generate output data comprising the fully-interpolated samples.

22. The method of claim 21 wherein the storing and combining are performed by one or more accumulators that receive outputs from the multiplexer,
wherein the method further comprises generating by each accumulator generates a portion of the fully-interpolated samples, and
wherein, the use of both the first and second accumulators prevents a memory access time of the first and second accumulators from limiting a rate of processing the down-range interpolated samples provided by the down-range resample filter.

23. A spotlight synthetic aperture radar (SAR) system comprising:
a receiver to generate input samples from radar returns, the input samples to be sampled along the flight path and generated with respect to a map center by directing a radar signal toward the map center;
a field-programmable gate array (FPGA) configured to interpolate the input samples in polar-grid coordinates to generate fully-interpolated samples representing phase-history data, and to perform a down-range Fourier transform on the fully-interpolated samples to generate output data for storage in a rectangular grid structure of an external memory; and
Fourier transform circuitry to perform a cross-range Fourier transform on data within the external memory,
wherein the FPGA is configured to include output-based resampling filters to interpolate the input samples by aligning a sinc function with an output grid in which input coordinates define filter coefficients to modulate the input samples,
wherein the FPGA generates the fully-interpolated samples to lie at intersections of grid lines parallel to the flight path and grid lines perpendicular to the flight path,
wherein the FPGA includes a plurality of tables to store data representing a sinc function
wherein coefficients for half of the sinc function are selected on a sample-by-sample basis from the tables for application to the input samples, and
wherein the FPGA further comprises:
weighting circuitry to apply the selected coefficients to the down-range interpolated samples;
a multiplexer to multiplex weighted samples provided by the weighting circuitry; and
one or more accumulators to store and combine outputs from the multiplexer to generate output data comprising the fully-interpolated samples.

24. The system of claim 23 wherein the output based resampling filters of the FPGA comprise:
a down-range resample filter to interpolate the input samples in polar-grid coordinates to generate down-range interpolated samples on the grid lines parallel to a flight path; and
a cross-range resample filter to interpolate the down-range interpolated samples to generate the fully-interpolated samples on the grid lines perpendicular to the flight path, the fully-interpolated samples representing phase-history data.

25. The system of claim 24 wherein the external memory comprises a random access memory (RAM) to receive output data from the down-range Fourier transform, and
wherein the cross-range Fourier transform generates output data for use in generating a SAR map around the map center.

26. A field-programmable gate array (FPGA) configured to:
interpolate input samples in polar-grid coordinates to generate down-range interpolated samples on grid lines parallel to a flight path; and
interpolate the down-range interpolated samples to generate fully-interpolated samples on grid lines perpendicular to the flight path,
wherein the input samples were sampled along the flight path and generated with respect to a map center by directing a radar signal toward the map center,
wherein the FPGA is configured to store data representing half of a sinc function within a plurality of tables,
wherein coefficients for half of the sinc function are selected on a sample-by-sample basis from the tables as part of the interpolation, and
wherein the FPGA is further configured to:
apply the selected coefficients to the down-range interpolated samples to generate weighted samples;
multiplex the weighted samples; and
store and combine outputs from the multiplexing to generate output data comprising the fully-interpolated samples.

27. The FPGA of claim 26 wherein the interpolation of the input samples is performed by a down-range resample filter within the FPGA,
wherein the interpolation of the down-range interpolated samples is performed by a cross-range resample filter within the FPGA, and
wherein the FPGA is further configured:
store the fully-interpolated samples from the cross-range resample filter in a rectangular grid structure in a memory, the fully-interpolated samples representing phase-history data; and
perform a down-range Fourier transform with down-range Fourier transform circuitry within the FPGA on portions of the phase-history data.

28. The FPGA of claim 27 wherein the down-range resample filter and the cross-range resample filter are output-based resampling filters that align a sinc function with an output grid and input coordinates define filter coefficients to modulate the input samples.

29. A field-programmable gate array (FPGA) configured to:
interpolate input samples in polar-grid coordinates to generate down-range interpolated samples on grid lines parallel to a flight path;

interpolate the down-range interpolated samples to generate fully-interpolated samples on grid lines perpendicular to the flight path;

store the fully-interpolated samples in a rectangular grid structure in a memory, the fully-interpolated samples representing phase-history data; and perform a down-range Fourier transform with down-range Fourier transform circuitry within the FPGA on portions of the phase-history data;

store data representing half of the sinc function within a plurality of tables, wherein each table of the plurality stores data representing a side lobe of the sinc function;

select coefficients for a first half of the sinc function on a sample-by-sample basis from the tables; and perform a bit-reversal of a table index to select at least some of the coefficients from the tables for a second half of the sinc function, wherein the input samples were sampled along the flight path and generated with respect to a map center by directing a radar signal toward the map center, wherein the interpolation of the input samples is performed by a down-range resample filter within the FPGA, wherein the interpolation of the down-range interpolated samples is performed by a cross-range resample filter within the FPGA, and wherein the down-range resample filter and the cross-range resample filter are output-based resampling filters that align the sinc function with an output grid and input coordinates define filter coefficients to modulate the input samples wherein within the cross-range resample filter, the FPGA is configured to:

apply the selected coefficients to the down-range interpolated samples provided by the down-range resample filter to generate weighted samples;

multiplex the weighted samples; and store and combining outputs from the multiplexing to generate output data comprising the fully-interpolated samples.

30. The FPGA of claim 29 wherein within the down-range resample filter, the FPGA is further configured to:

apply the selected coefficients to the input samples; and combine and delay the weighted samples to generate output samples.

* * * * *